US012399872B2

(12) United States Patent
Jin

(10) Patent No.: US 12,399,872 B2
(45) Date of Patent: Aug. 26, 2025

(54) INTELLIGENT SERVICE FOR DATA MIGRATION

(71) Applicant: Salesforce, Inc., San Francisco, CA (US)

(72) Inventor: Xinwei Jin, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 320 days.

(21) Appl. No.: 18/155,384

(22) Filed: Jan. 17, 2023

(65) Prior Publication Data

US 2024/0241866 A1    Jul. 18, 2024

(51) Int. Cl.
G06F 16/21    (2019.01)
G06F 11/34    (2006.01)

(52) U.S. Cl.
CPC ........ *G06F 16/214* (2019.01); *G06F 11/3457* (2013.01)

(58) Field of Classification Search
CPC ............................ G06F 16/214; G06F 11/3457
See application file for complete search history.

(56) References Cited

U.S. PATENT DOCUMENTS

| 9,215,096 B2 | 12/2015 | Vasudev et al. |
| 10,387,821 B2 | 8/2019 | Mack et al. |
| 10,460,270 B2 | 10/2019 | Jain et al. |
| 10,616,337 B1 * | 4/2020 | Satyanarayana .... H04L 67/1097 |
| 10,853,334 B2 | 12/2020 | Gangadhar et al. |
| 11,016,757 B2 | 5/2021 | Sreenivasa et al. |
| 11,403,280 B2 | 8/2022 | Fuchs |
| 11,615,061 B1 * | 3/2023 | Malik .................... G06F 16/214 707/602 |
| 12,174,804 B2 * | 12/2024 | Buehne .................. G06F 16/182 |
| 12,204,505 B1 * | 1/2025 | Singh ..................... G06F 16/214 |
| 2015/0019197 A1 * | 1/2015 | Higginson .............. G06F 30/20 703/22 |
| 2018/0285353 A1 * | 10/2018 | Ramohalli Gopala Rao ............... G06F 16/214 |
| 2019/0236150 A1 * | 8/2019 | Zaslavsky ........... G06F 16/2308 |
| 2020/0104375 A1 * | 4/2020 | Earnesty, Jr. ......... G06F 16/214 |

(Continued)

*Primary Examiner* — Robert W Beausoliel, Jr.
*Assistant Examiner* — Susan F Rayyan
(74) *Attorney, Agent, or Firm* — Kowert, Hood, Munyon, Rankin & Goetzel, P.C.; Catherine L. Gerhardt; Dean M. Munyon

(57) ABSTRACT

The disclosed techniques for generating a migration plan include identifying one or more entities that are eligible for data migration to a destination database from a source database. The techniques include generating, using planning procedures that include a workload balancing procedure, a data migration plan for the eligible entities and executing the migration plan. The workload procedure includes mapping, based on data metric values of the eligible entities, different ones of the eligible entities to instances in the destination database, where the mapping is performed based on utilization metric values of the instances, and where the instances are of a storage service that collectively implements the destination database. The workload balancing procedure includes altering the mappings of entities to instances in the destination database, where the remapping is based on a standard deviation of data for entities mapped to instances in the destination database not meeting a threshold standard deviation.

20 Claims, 8 Drawing Sheets

(56) References Cited

U.S. PATENT DOCUMENTS

| | | | |
|---|---|---|---|
| 2020/0104376 A1* | 4/2020 | Earnesty, Jr. | G06F 16/285 |
| 2020/0104377 A1* | 4/2020 | Earnesty, Jr. | G06F 16/285 |
| 2020/0233600 A1* | 7/2020 | Swamy | G06F 3/067 |
| 2021/0103852 A1* | 4/2021 | Kamenetskaya | G06F 9/505 |
| 2021/0112059 A1 | 4/2021 | Heldman et al. | |
| 2021/0240799 A1 | 8/2021 | Wong | |
| 2021/0349865 A1* | 11/2021 | Shah | G06Q 30/0283 |
| 2022/0253443 A1* | 8/2022 | Gold | G06F 3/06 |
| 2023/0350915 A1* | 11/2023 | Ranjan | G06F 16/214 |
| 2023/0376506 A1* | 11/2023 | Levari | G06F 16/278 |

* cited by examiner

INTELLIGENT SERVICE FOR DATA MIGRATION

BACKGROUND

Technical Field

This disclosure relates to data storage, in particular to techniques for migrating e.g., first party data to a public cloud.

Description of the Related Art

Computer systems may include multiple computers, workstations, servers, and storage systems, each performing different tasks. For example, in some computer systems, a particular computer may be executing software for managing e-mail messages, while other workstations, in the computer systems, may be used for word processing, web browsing, database storage, and the like.

Databases are a common method for organizing stored data in computer systems. During operation of a computer system, multiple requestors generate requests to access a database. Such requests may include a request for retrieval of one or more particular records, the storage of a new record, or the removal of a previously stored record from the database. A computer executing a software program to manage the database may schedule data to be stored in the database according to the various requests for access to the database. During the execution of a particular request, the computer may traverse the database to retrieve or delete a desired record, or determine an appropriate location in which to add a new record. Moving data from one storage location to another often results in long downtimes for the data and may impact the response times of the computer system to requests to access the database (e.g., to retrieve data) during such a move.

DETAILED DESCRIPTION OF EMBODIMENTS

Figure 1:
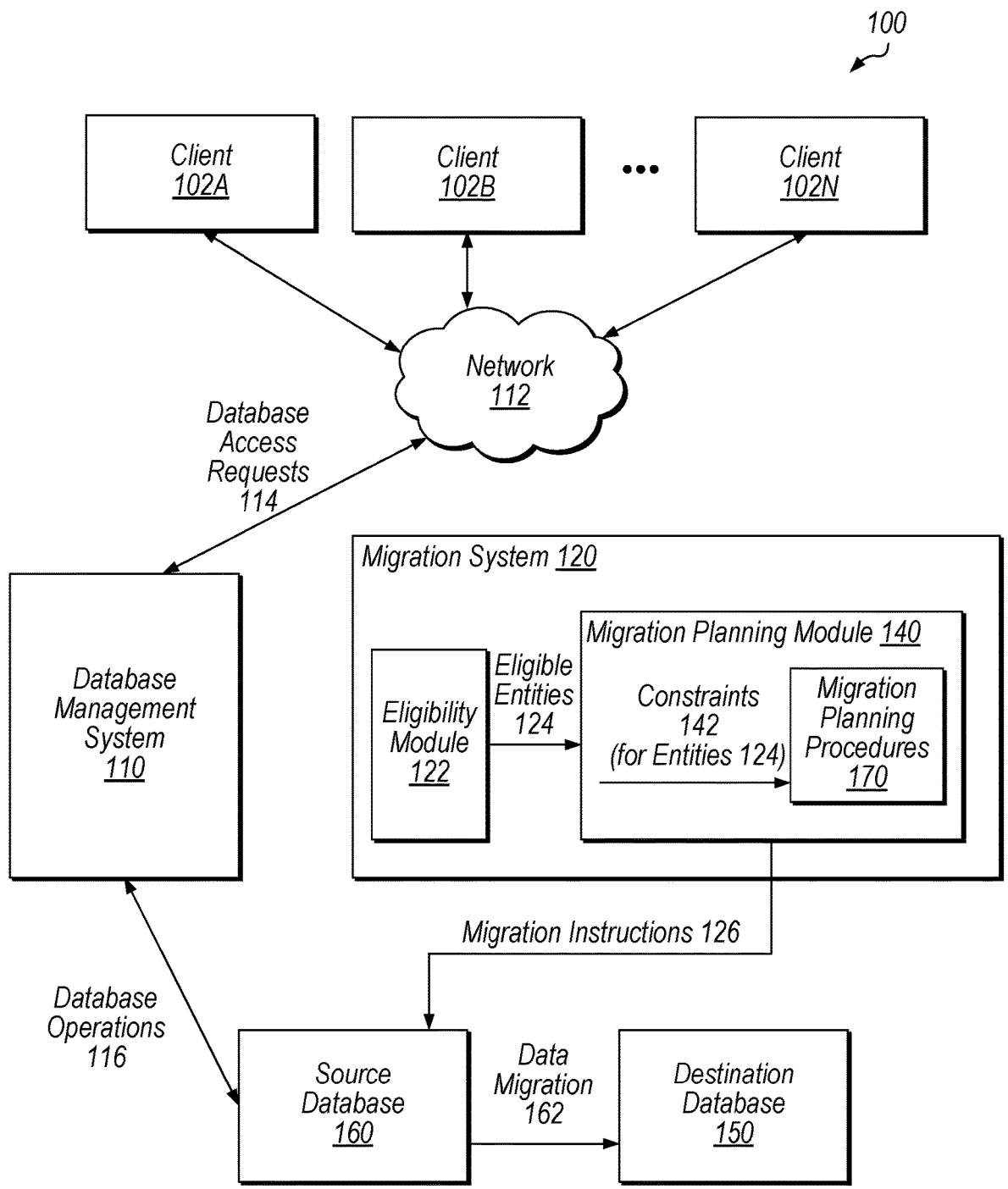
FIG. 1 is a block diagram illustrating an example system configured to generate migration plans for migrating data, according to some embodiments.

Databases may use different data structures for storing and accessing data. In some cases, a database may be implemented locally to a given system gathering data e.g., from end users. For example, an Enterprise system may store data for various different entities including various end users in a first party infrastructure. In other cases, a system may directly store data for end users within a cloud storage environment. In some situations, it may be desirable to switch from one storage infrastructure to another. For example, many systems may wish to switch from a local storage mechanism to cloud-based storage to offload some of the database hardware maintenance responsibility to a cloud storage service. In order to make a switch, the user data must be migrated from one infrastructure to another. In such situations, however, the system attempting to migrate their data from one storage infrastructure to another encounters many challenges, including downtime of user data during migration, entity computational capacity, computational costs, data distribution throughout database instances, entity-specific data availability and efficiency constraints, constraints of both the source and destination databases (e.g., in terms of processing and storage capacity), handling different amounts and types of data for multiple entities, etc. The disclosed techniques attempt to balance the workload migrating user data from one database to another on a large scale while minimizing e.g., computation costs.

The present disclosure describes various techniques for generating migration plans to automatically and efficiently migrate customer data from one database to another with minimal interruption to the availability of the data to the customers during migration. For example, the migration plans may automatically migrate data for different organizations from a first party infrastructure (where data is directly gathered by various services utilized by the organizations such as in an Enterprise environment) to a public cloud infrastructure (e.g., Amazon Web Services™ or Google Cloud Platform™). In order to accomplish automated and seamless data migration, the disclosed techniques generate a migration plan (which may include individual plans for respective entities) for migrating data for multiple different entities using a workload planning procedure.

The workload balancing procedure executed by the disclosed migration planning system determines mappings for eligible entities (e.g., organizations that have approved their data for public cloud storage) to different instances of a destination database using e.g., a greedy mapping technique. For example, the workload balancing procedure maps an entity with the largest amount of data to a cloud database instance that is currently being utilized the least (e.g., an instance that has a large amount of storage and processing capacity available and does not have large amounts of data that are currently being migrated to/stored in this instance). Once the workload balancing procedure has mapped a queue of entities to different cloud database instances, this algorithm performs a swap optimization procedure to improve the efficiency of the current mappings. For example, if the standard deviation of the utilization of cloud database instances is greater than a predetermined threshold standard deviation, then the swap optimization procedure selects an organization with a minimum metric value (minimum amount of data to be migrated) from a database instance that has the largest utilization and swaps it (assigns the data for this entity) to a database instance with the lowest current utilization. The standard deviation may be checked again and this process may be repeated until a desired standard deviation is measured.

As used herein, the term "planning procedure" refers to an algorithm that is executable to plan one or more aspects of a data migration. For example, in disclosed techniques, a load balancing procedure is an algorithm that is executed by a migration planning system to determine which data for different entities will be migrated to which instances of a destination database as discussed in further detail below with reference to FIGS. 1, 2, and 5. As used herein, the term "entity" is intended to be construed according to its well-understood meaning, which includes a group, institution, body, or unit for which data is to be migrated via the disclosed migration system. For example, an entity is the smallest unit for which data is migrated. As one specific example in the context of Salesforce.com, an entity may be an organization or a customer. In contrast, in some situations, an entity may be two or more organizations.

In various embodiments described below, migration plans are executed to migrate data without negatively impacting customer experience (e.g., the migration plans limit the amount of time that user data is unavailable). Further, such techniques may advantageously decrease cost (e.g., both computational and monetary) associated with a number of database instances utilized to move and store migrated data. Still further, the disclosed techniques may advantageously improve overall database operation, while satisfying both customer and database constraints. The disclosed techniques assign data for entities (e.g., organizations) to proper public cloud database instances to reduce the number of instances being used, which advantageously reduces the amount of computing resources used, which in turn reduces both computing resource and monetary costs. In addition, execution of migration plans generated using the disclosed techniques advantageously reduces downtime for customer data. These techniques may be advantageous over prior approaches as such techniques allow for automated data migration, continuous updates, and alterations to the data migration plans as the migration plans are executed over a given time interval (e.g., hours, days, months, years, etc.). These techniques are further advantageous over prior approaches due to these techniques allowing for the customization of migration plans for respective different entities based on the amount and types of data to be migrated for these different entities. An exemplary application of these techniques will now be discussed, starting with reference to FIG. 1.

Example Migration System

Turning now to FIG. 1, a block diagram of an example system 100 is shown. Within system 100, a network 112 may represent the Internet, an intranet, or any other suitable type of computer network. The network 112 may couple one or more clients 102A-102N to a database management system 110. System 100 further includes migration system 120 and source database 160. Source database 160 may include multiple source database instances. In some embodiments, system 100 also includes destination database 150. In other embodiments, destination database 150 is executed and maintained by another system. Destination database 150 may also be referred to as a "target database" and its instances may be referred to as "target instances." In various embodiments, clients may be requestors to the database management system 110 via network 112 to connect with source database 160 to perform various database operations 116. Client connections with source database 160 allow for read or write operations. For example, clients 102A-102N may submit database access requests 114 via network 112 to database management system 110, and system 110 performs database operations 116 on source database based on the access requests 114.

In some embodiments, source database 160 is a non-cloud database (e.g., that stores first party data) and destination database 150 is a cloud database. For example, source database 160 may be a first party database implemented by Salesforce™, while destination database 150 may be a cloud database implemented via a relational database. Destination database 150 may be implemented via Amazon Web Services™, EnterpriseDB™, Cloud SQL™, Azure™, etc.

Migration system 120, in the illustrated embodiment, includes eligibility module 122 and migration planning module 140. Eligibility module 122 determines whether entities of system 100 are eligible for data migration from source database 160 to destination database 150. For example, eligibility module 122 determines whether entities have approved their data, that is currently stored at source database 160, for migration to a destination database 150. In some situations, a given entity may have a contract with an enterprise system such as system 100 specifying that they do not approve their data for migration, particularly in situations in which their data would be migrated to a public cloud storage service. In still other situations, a given entity may be in the process of being onboarded by an enterprise system and, thus, is not eligible for data migration at least until they have finalized the onboarding process. In the illustrated embodiment, eligibility module 122 sends a list of eligible entities 124 to migration planning module 140.

Figure 3:
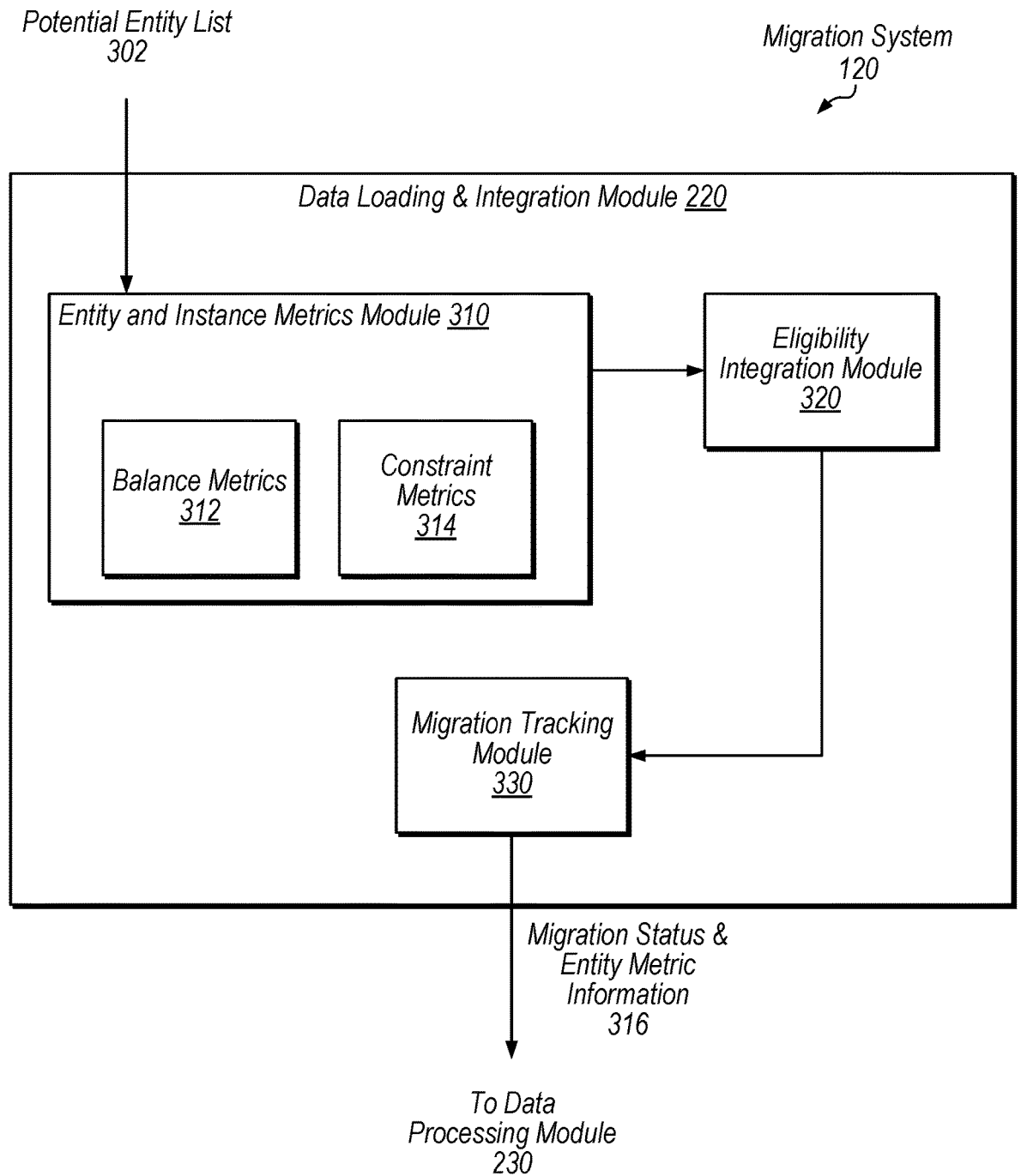
FIG. 3 is a block diagram illustrating an example data loading and integration module, according to some embodiments.

Based on the received list and different sets 142 of constraints for different entities, migration planning module 140 executes migration planning procedures 170 to generate a migration plan for migrating data for the different entities. In some embodiments, migration planning module 140 generates individual migration plans for each of the different entities. As discussed below in further detail with reference to FIGS. 3-5, the migration planning procedures 170 may include one or more of the following procedures: a mapping procedure, a swapping procedure, a migration event planning procedure, and a migration impact simulation procedure. In some embodiments, the set 142 of constraints for different entities includes constraints that are based on different database metrics (e.g., for both the source database 160 and the destination database 150) and guidelines corresponding to different entities. For example, the different database metrics may include computer resource constraints, such as load times, input/output (I/O) on the disk, database instance central processing unit (CPU) time and utilization, database instance storage capacity, etc. Further in this example, the different guidelines corresponding to different entities may include an eligibility date (e.g., when is this entity's data eligible for migration), geographic location (where is this entity currently located and where is their data currently stored), etc.

Figure 5:
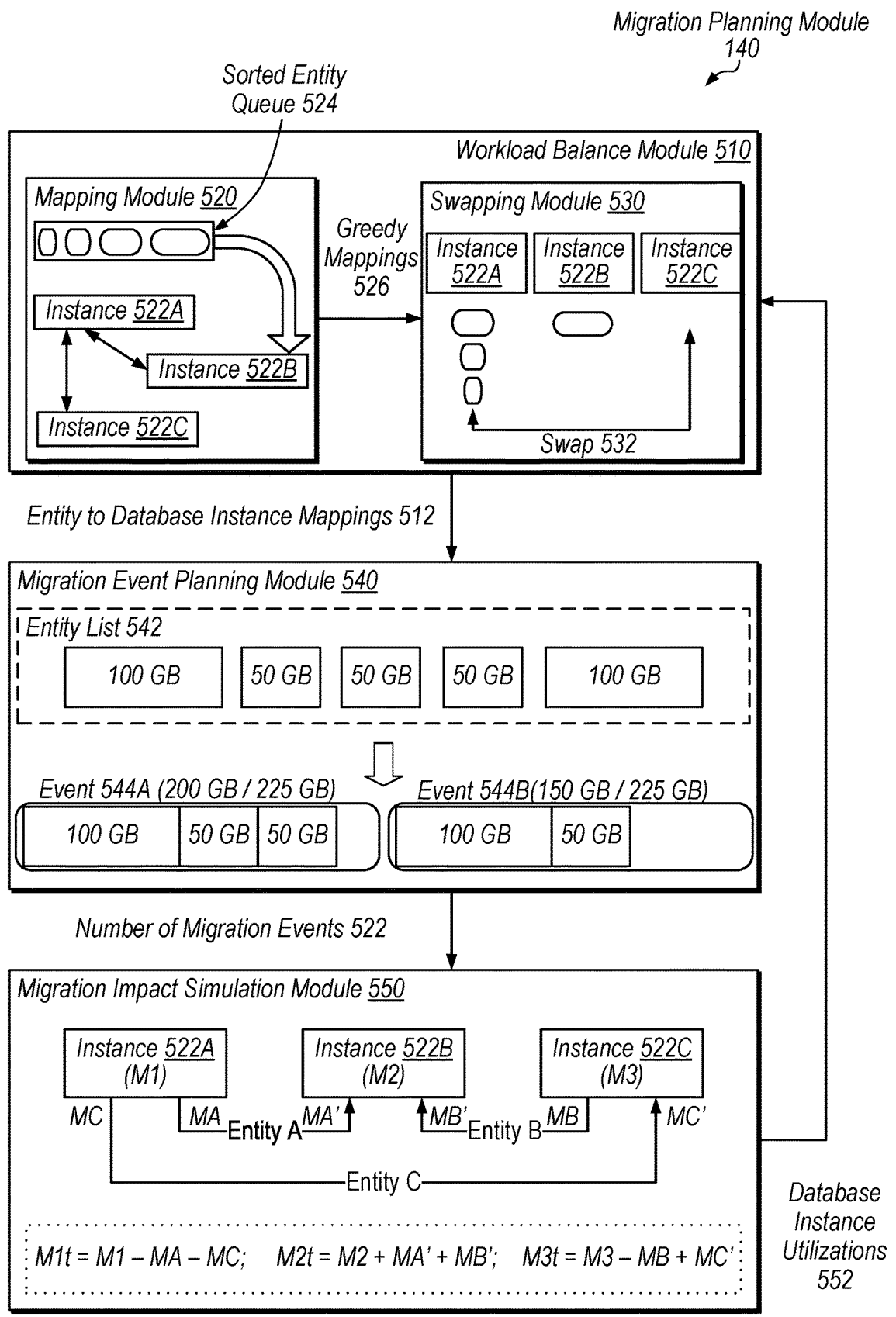
FIG. 5 is a block diagram depicting example migration planning procedures, according to some embodiments.

When executing migration planning procedures 170 to generate a migration plan, migration planning module 140 executes at least a mapping procedure that assigns, using a greedy base mapping algorithm, a largest entity to an instance in the destination database 150 with a largest capacity. For example, migration planning module 140 may generate a queue of eligible entities 124 sorted according to the amount of data each entity has to be migrated, such that a largest entity is at the front of the queue and the smallest entity is at the back of the queue. According to this queue, the migration planning module 140 assigns a largest entity to a database instance with the greatest capacity, then the next largest entity to a database instance with the next greatest capacity, and so forth until every entity in the queue has been assigned to a database instance as shown in FIG. 5. In some instances, a small entity located toward the end of the queue may be assigned to the same database instance as a large entity if the database instance is not yet at capacity with the data from the large entity, for example.

In addition to performing a greedy base mapping, migration planning module 140 executes a swap optimization planning procedure to swap one or more entities between different database instances based on calculating a standard deviation across a plurality of instances of a destination database. In some embodiments, the greedy base mapping performed by migration planning module 140 achieves CPU normalization across computers that will be executing the migration plans generated by migration system 120. For example, different database instances may have different processing speeds. In this example, the differences in speeds might cause users to request that their work be run on a faster instance to reduce costs, which may lead to heavy workloads on the faster instances while slower units stand idle. To avoid such situations, an enterprise system may normalize the processing speeds across database instances to more evenly distribute CPU utilization, for example.

In the illustrated embodiment, migration system 120 transmits migration instructions 126 to source database 160 to cause execution of a data migration plan 162 generated by system 120. Execution of the data migration plan 162 causes a data migration from source database 160 to destination database 150. In some embodiments, system 100 executes an overall migration plan for multiple different entities to migrate their data from source database 160 to destination database 150. In other embodiments, system 100 executes individual migration plans for respective different entities to migrate their data from source database 160 to destination database 150. For example, system 100 may execute these individual migration plans in parallel, may execute them at different times, or may begin execution of the individual migration plans at different times but with some overlap in the execution. Migration instructions 126 may specify to migrate data during a specific time period. As one specific example, a migration plan may be executed during a 90-day period in which subsets of an overall set of data are migrated on an hourly, daily, weekly, etc. basis within the 90-day migration period.

As discussed above prior to the description corresponding to FIG. 1, in some embodiments, migration system 120 continuously updates migration plans during execution of those migration plans over a period of time (e.g., over a year). For example, migration system 120 may perform multiple iterations of generating and updating migration plans for multiple different entities e.g., based on the performance of the migration plans during execution. As discussed below in further detail with reference to FIG. 4, migration system 120 may determine to exclude an entity from future iterations of generating or updating migration plans e.g., if all of the data for this entity has been successfully migrated.

Figure 2:
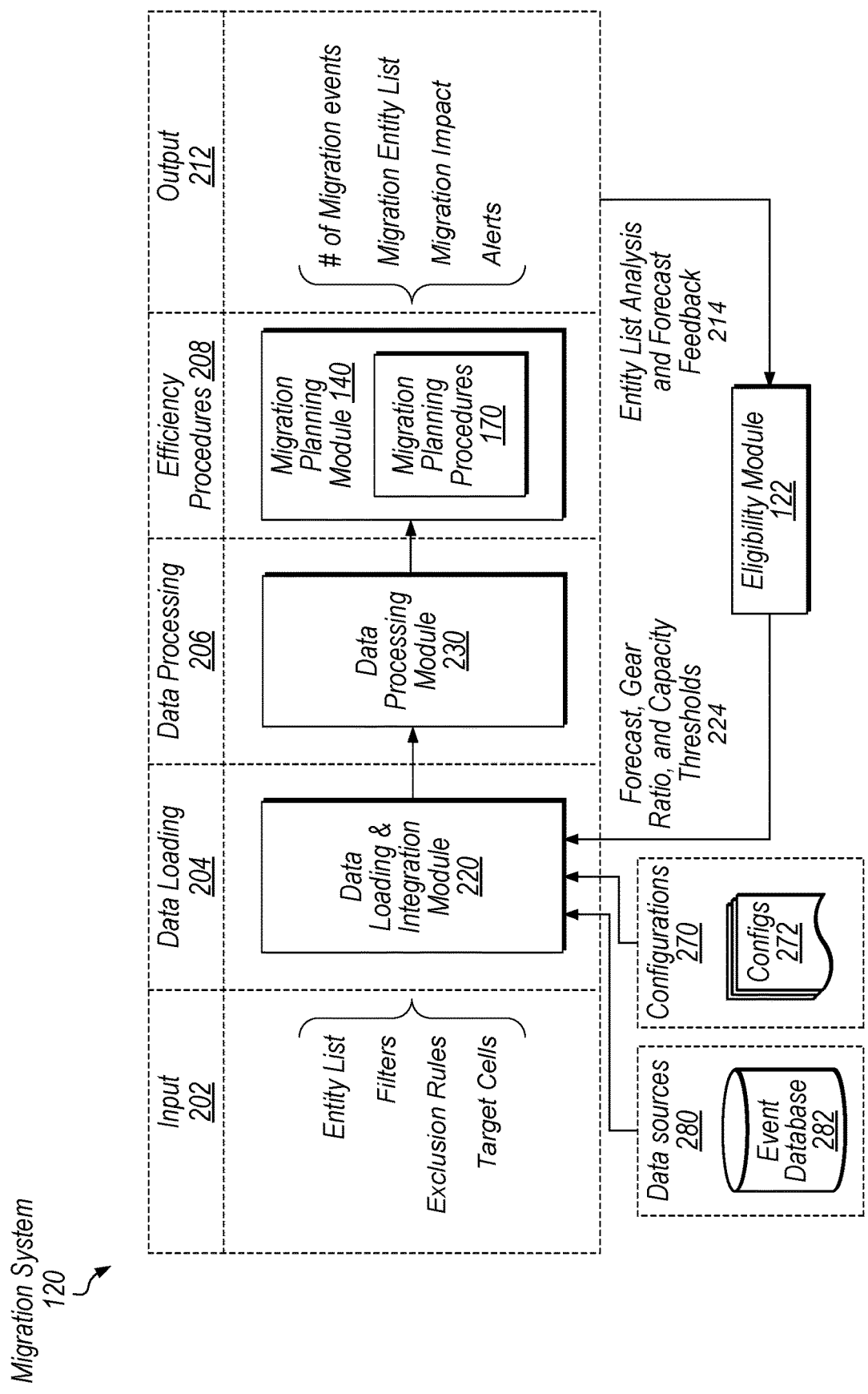
FIG. 2 is a block diagram depicting an example migration system, according to some embodiments.

Turning now to FIG. 2, a block diagram is shown depicting an example migration system 120. The diagram shown in FIG. 2 illustrates an example of how the migration system utilizes multiple data sources and configurations for a plurality of entities to determine an efficient plan for automatically migrating data for the plurality of entities from one database to another database.

As one specific example, the migration system 120 illustrated in FIG. 2 loads customer data for different customers and determines whether these customers are eligible to store their data e.g., in a cloud database. In this example, a given customer may have a contract with system 100 indicating they do not permit their data to be stored in the cloud. After determining eligibility, migration system 120 balances the workload of data for different eligible customers between instances of the database to be migrated to, in order to reduce the cost (both computational and financial) of the data migration. Still further in this example, migration system 120 plans the execution of the migration based on mappings between customers and target instance (e.g., based on time of day to begin migration, how long it will take to execute the migration, the amount of resources allocated to each database instance, etc.). During execution of the migration plan, in this example, migration system 120 determines the impact on the customer usage of the data (e.g., did the customer have to wait to access their data during downtimes due to the migration and, if so, how long did they wait, how many users had to wait, etc.). While the migration system 120 might plan e.g., a year of continuously migrating customer data for a set of customers, the migration system 120 updates the migration plan during execution based on feedback.

In the illustrated embodiment, migration system 120 includes several different stages to be executed when generating migration plans: an input stage 202, a data loading stage 204, a data processing stage 206, a stage 208 of executing efficiency procedures, and an output staged 212. In addition, migration system 120 executes a feedback stage in which eligibility module 122 determines whether one or more entities are still eligible for migration (e.g., determines whether the data for one or more entities has already been migrated and, if so, identities that these entities are no longer eligible). Still further, migration system 120 includes data sources 280 and configurations 270 that are inputs at the data loading stage 204 and are considered when generating migration plans.

In the illustrated embodiment, migration system 120 receives various input 202, including a list of entities (e.g., organizations) of system 100. Input 202 further includes filters indicating one or more limitations (e.g., filter by geographic region, migration eligibility date, etc.) to be used to determine eligibility for entities included in the list. Input 202 also includes exclusion rules indicating one or more rules for determining when to exclude one or more entities from migration planning. Still further, input 202 includes a list of target cells indicating a capacity footprint of the data. For example, the capacity footprint of the target cells indicate detailed information for candidate instances of the destination database (e.g., instances of a cloud database to which data is being migrated), including, e.g., release cycles, database types, geographic regions, etc. The data specified in the capacity footprints may be used by migration planning module 140 to map entities to various instances of the destination database. System 120 feeds this information into data loading and integration module 220. Data loading and integration module 220 performs a set of pre-processing operations on the input 202 to determine the eligibility of entities included in the entity list and to gather information for eligible entities as well as the source and destination databases. For example, data loading and integration module 220 retrieves information from data sources 280 (including event database 282 which is one example of source database 160) and configurations 270 from configs database 272. For example, configurations 270 are documentation that different entities may upload at runtime to configs database 272 that allow application programming interfaces (APIs) of these entities to integrate with e.g., eligibility module 122. Further, data loading and integration module 220 receives information 224 specifying forecasted impact of a migration plan, a gear ratio used to convert between metrics of the source and destination databases, and capacity thresholds from eligibility module 122 as part of a feedback portion of system 120 as discussed in further detail below with reference to the output stage 212.

Data processing module 230, in the illustrated embodiment, receives various information corresponding to different eligible entities during data processing stage 206. For example, information received from data loading and integration module 220 indicates a current migration status (e.g., based on feedback information from eligibility module 122) and various metric information for different eligible entities. As discussed in further detail below with reference to FIG. 4, data processing module 230 performs various metric conversion operations before providing these converted metrics to migration planning module 140.

Migration planning module 140, in the illustrated embodiment, executes a plurality of migration planning procedures 170 during efficiency procedures stage 208 based at least on converted metrics received from data processing module 230. Migration planning module 140 outputs a number of migration events, a list of entities included in the migration plan, simulated impact information for the generated migration plan, the migration plan itself, and alerts during an output stage 212. For example, the output from migration planning module 140 is in the format of an entity list which includes the metrics and metadata required for entity migration execution (e.g., in the form of an entity migration plan). The alerts output by migration planning module 140 during output stage 212 may include an overall migration report (that may include generated migration plan(s)). The alerts output by module 140 include various warning messages generated during the migration planning process. These alerts may be reviewed by a system administrator or one or more managers corresponding to the various entities involved in the migration plans. As one specific example, an alert may indicate one or more entities whose data the system is unable to migrate due to: constraints or metrics of the destination database, capacity issues of the destination database, computational resources of the one or more entities, legal constraints of the one or more entities, etc.

The output from migration planning module 140 may be input into eligibility module 122 during a feedback stage. For example, in the illustrated embodiment, information 214 indicating a list of eligible entities selected by data loading and integration module 220 at the data loading stage 204 and a forecasted (simulated) analysis of the impact of the migration plan are input into eligibility module 122. Based on this information, eligibility module 122 performs an updated evaluation of entities included in the entity list for which data is to be migrated. Based on this information, eligibility module 122 may update the entity list and transmits this information, the forecast for migration of data according to migration plan(s) generated by migration planning module 140, a conversion ratio (such as a gear ratio for converting metrics), and capacity thresholds (e.g., indicating limits on the capacity of different instances in a destination database) to data loading and integration module 220. Such information may be fed back into migration system 120 to be used during generation of and updates to future migration plans (e.g., this information is utilized by migration planning procedures 170 to generate new or update previously generated migration plans).

Example Data Loading and Integration Module

When a migration system, such as, e.g., migration system 120 receives information regarding various entities for which data is to be migrated, the migration system may perform a series of operations to load data for these entities, including various constraints associated with these entities, constrains associated with the data to be migrated, and constraints associated with the databases involved in the migration, in order to generate efficient migration plan(s) for these entities. An embodiment of a data loading and integration module 220 is depicted in the block diagram of FIG. 3. In the illustrated embodiment, migration system 120 includes data loading and integration module 220, which in turn includes entity and instance metrics module 310, eligibility integration module 320, and migration tracking module 330.

Entity and instance metrics module 310, in the illustrated embodiment, receives a list 302 of potential entities and gathers metrics for this list. For example, module 310 may determine both balance metrics 312 and constraint metrics 314 for the list 302 of entities and transmit this information to eligibility integration module 320. Balance metrics 312 include metrics to be utilized to balance data across instances of a target database (e.g., a destination database to which data is being migrated). For example, balance metrics 312 include a database CPU utilization metric (which may be used for planning migration of production data for various entities) and a storage metric (which may be used for planning migration of staging or test data for various entities). In addition to determining metrics for these entities, data loading and integration module 220 generates queries for retrieving entity data that is to be migrated from various data sources. For example, data loading and integration module 220 sets up and manages database connections to one or more source databases (e.g., source database 160) in order to periodically collect data into migration system 120 (or some other system executing migration plans) for migration to a destination database.

Eligibility integration module 320, in the illustrated embodiment, receives both balance metrics 312 and constraints metrics 314 from module 310. Based on these metrics, eligibility integration module 320 determines whether one or more entities are eligible for data migration (e.g., from source database 160 to destination database 150). For example, eligibility integration module 320 determines whether the data for an entity is eligible based on various different types of metrics and metadata. Example metrics and metadata input to module 320 may include: geographic region where the entities data is currently stored, a capacity of a given entity (e.g., what is the capacity of the computational resources this entity currently has access to), capacity thresholds of a destination database (to which data is being migrated), legal constraints, feature parity, release cycles, etc. The metrics and metadata used by module 320 when determining eligibility may vary from entity to entity.

Migration tracking module 330, in the illustrated embodiment, receives a list of entities that module 320 has deemed eligible for data migration. Based on this information, migration tracking module 330 keeps tabs on the entities included in this list during execution of their migration plans that are executed by migration system 120. For example, the migrations executed by system 100 (shown in FIG. 1) may be scheduled and executed continuously. As such, it is crucial for migration system 120 to be aware of all ongoing and planned migrations. In some embodiments as discussed above with reference to the eligibility module 122 shown in FIG. 2, migration tracking module 330 sends feedback to eligibility engine integration module 320. For example, this feedback may indicate that all data for a given entity has been successfully migrated from a source database 160 to a destination database 150. Based on this feedback, eligibility integration module 320 may in turn determine that this entity is no longer eligible for (and indeed does not require) data migration.

This type of continuous monitoring by migration tracking module 330 may advantageously improve user experience by excluding entities that are already planned for future migrations (e.g., which decreases the chances and amount of time that data for these entities is unavailable due to migration). The continuous monitoring by migration tracking module 330 may advantageously simulate the impact of planned migrations on instances of a target database. Migration tracking module 330 outputs a current migration status of one or more entities based on how far along execution of respective migration plans are for these one or more entities. Migration tracking module 330 further outputs entity metric information 316 which may include balance metrics 312 and constraint metrics 314 to data processing module 230.

Example Data Processing Module

Figure 4:
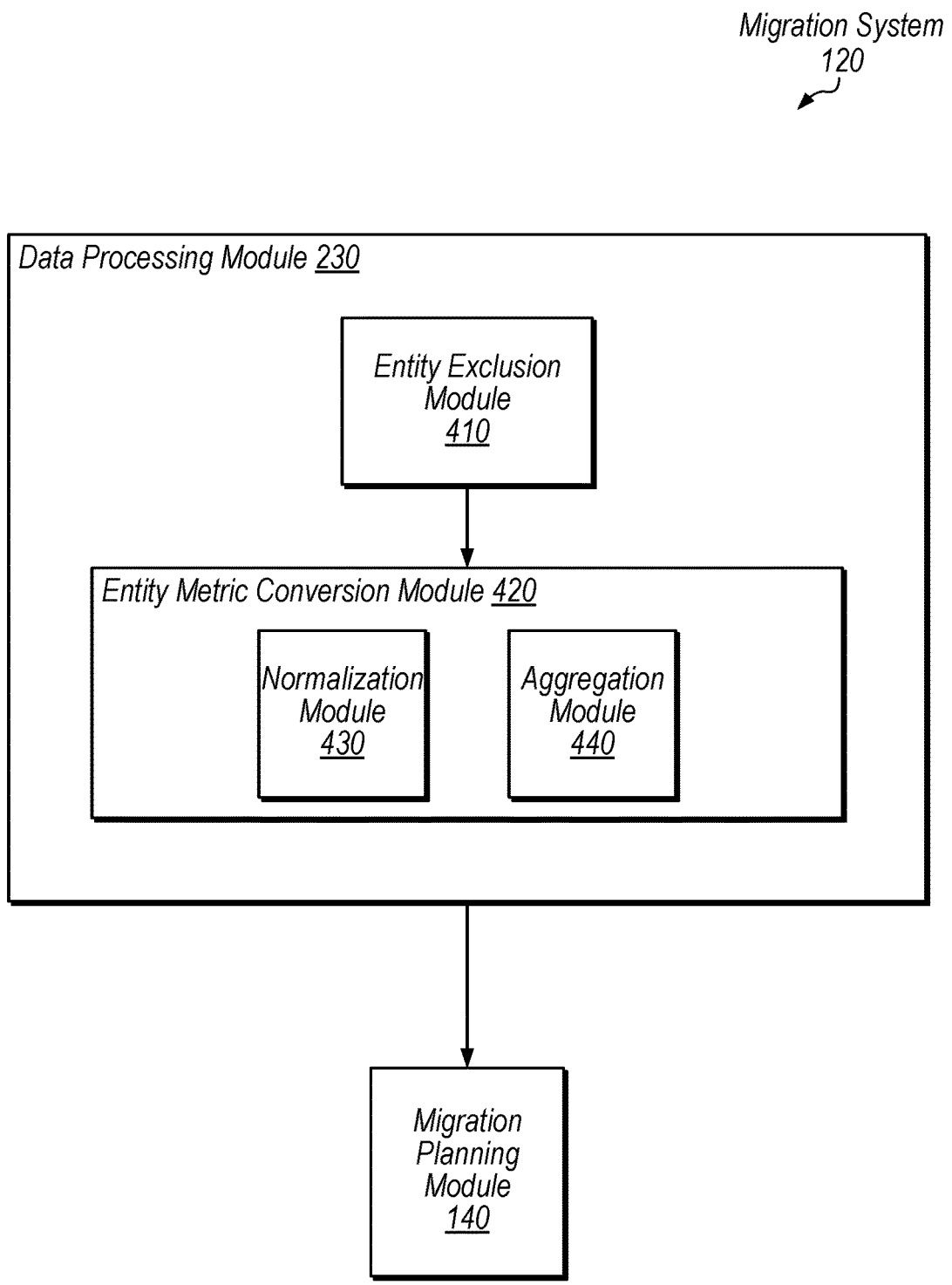
FIG. 4 is a block diagram depicting an example data processing module, according to some embodiments.

FIG. 4 is a block diagram depicting an example data processing module. In the illustrated embodiment, migration system 120 includes migration planning module 140 and data processing module 230, which in turn includes entity exclusion module 410 and entity metric conversion module 420.

Data processing module 230 executes entity exclusion module 410 to perform a check-in on entities to be (or already) included in a migration plan. For example, entity exclusion module 410 determines whether entities (e.g., organizations) deemed eligible by eligibility integration module 320 are still eligible based on at least partial execution of one or more migration plans. In particular, entity exclusion module 410 determines whether an entity should be excluded from future migrations based on one or more exclusion rules. For example, one exclusion rule specifies that if the entity is already part of a future planned migration then the entity is to be excluded for a current migration planning iteration to prevent entity data being migrated multiple times. Another exclusion rules specifies that if data for an entity is already stored on at least one instance of the destination database 150, then this entity should be excluded for a current migration planning iteration.

Entity metric conversion module 420, in the illustrated embodiment, performs conversion operations to generate entity metrics that are compatible across different entity and database types. For example, module 420 may execute normalization module 430 to normalize an absolute database CPU time to database CPU utilization in situations in which a source database 160 and a destination database 150 have different infrastructures (e.g., different hardware, database types, etc.) For example, the source database may be a local type of database while the destination database is implemented in the cloud. Normalization module 430 may use a gear ratio to convert a metric for a given entity from a metric that corresponds to an instance of the source database to a metric that corresponds to an instance of the destination database. Entity metric conversion module 420 executes aggregation module 440 to combine one or more metrics for a given entity. For example, metrics may be collected for a given entity over a long period of time (e.g., over days, months, years, etc.) resulting in many metric values. In this example, aggregation module 440 applies one or more statistical functions (e.g., averaging, percentile operations, etc.) to generate minimal representative metric values for various different metrics measured for the given entity. Such techniques may advantageously reduce the overall workload and cost when executing downstream procedures (e.g., migration planning procedures 170) utilized by the migration system 120.

Data processing module 230, in the illustrated embodiment, outputs converted metrics for various entities to migration planning module 140 to be used during generation of one or more migration plans. For example, data processing module 230 determines the database CPU utilization of an entity at a source database over a given period of time (e.g., ~60,000 data points such as $X_1, X_2, \ldots, X_n$) and aggregates the resulting data values into a single value. As one specific example, the data processing module 230 may calculate multiple statistical aggregation functions (e.g., $95^{th}$ percentile) to generate a single database CPU utilization value for the entity (e.g., $X=P95(X_1, X_2, \ldots, X_n)$). Then, data processing module 230 converts this value to a target database value by applying a gear ratio (e.g., $Y$) to convert the metric value from a source database metric to a target database metric. After the conversion using the gear ratio, the database CPU utilization metric for the entity on the target database will be e.g., $X*Y$.

Example Migration Planning Models

FIG. 5 is a block diagram illustrating example migration planning procedures, according to some embodiments. In the illustrated embodiment, migration planning module 140 includes workload balance module 510, migration event planning module 540, and migration impact simulation module 550.

Workload balance module 510, in the illustrated embodiment, includes mapping module 520 and swapping module 530. Using mapping module 520 and swapping module 530, workload balance module 510 normalizes database CPU utilization across destination database instances. For example, mapping module 520 executes a greedy base mapping operation to map an entity with a largest metric value (e.g., the largest amount of data to be migrated) to a target database instance with a minimum metric value (e.g., an instance that is currently being utilized the least or has the greatest capacity). In contrast, swapping module 530 attempts to improve the normalized database CPU utilization achieved by the mapping module 520. For example, if swapping module 530 detects that one or more target database instances are not balanced (e.g., a standard deviation for the target instances is above a threshold), module 530 will move one or more mappings between one or more target instances.

Migration planning module 140 inputs a sorted queue 524 of entities, which is sorted from largest (at front of queue) to smallest (at back of queue). Mapping module 520, in the illustrated embodiment, utilizes the sorted queue 524 of entities to assign different ones of the entities to different instances 522A, 522B, and 522C of a destination database. For example, mapping module 520, performs a greedy mapping to map a largest entity (at the front of queue 524) to a database instance with a largest capacity (e.g., instance 522B). According to this greedy mapping procedure, mapping module 520 maps a second, third, and fourth largest entities in queue 524 to database instance 522A (an instance with a second largest capacity after instance 522B). For example, a first instance of a destination database that is implemented via a cloud storage system may have a larger capacity than a second instance of the destination database due to the first instance being located in a data center having a larger hardware capacity than the data center in which the second instance is located. In some embodiments, mapping module 520 maps data for a single entity to multiple target database instances. For example, if an entity is very large and includes a large amount of data to be migrated, it may not be possible (or efficient) to migrate all of the data for this entity to a single database instance.

Swapping module 530, in the illustrated embodiment, receives greedy mappings 526 from mapping module 520. Based on the greedy mappings 526, swapping module 530 calculates a standard deviation for the database instances according to the metrics of the entities currently mapped to the database instances. If the standard deviation calculated by swapping module 530 meets a predetermined standard deviation threshold, module 530 performs a swapping operation 532 e.g., to move the smallest entity currently mapped to instance 522A to be mapped to instance 522C to improve the efficiency of the planned migration of data for the entities sorted in queue 524. For example, swapping module 530 will identify a mapped entity that has a minimum metric (e.g., a least amount of data to be migrated) that is mapped to a database instance with a largest capacity metric and move its mapping to a database instance with a smallest capacity metric. Swapping module 530 may repeat the standard deviation calculation and swapping operations until a calculated standard deviation for the swapped mappings is below the predetermined standard deviation threshold. As one specific example, migration system 120 (or an administrator of the system) may set the standard deviation threshold to 5%. In this specific example, if swapping module 530 calculates a standard deviation for the destination database that is less than 5%, then the swapping operations executed by the swapping procedure terminate. In general, a smaller standard deviation indicates that the metric on the destination database is well balanced.

In some embodiments, in addition to performing greedy mapping and swap optimization operations, workload balance module 510 performs constraints matching operations. For example, while mapping entities to target database instances, workload balance module 510 keeps track of current metrics on each target instance. In this example, if one or more metrics of a target instance exceeds a capacity threshold (e.g., a CPU capacity threshold or a storage capacity threshold), the target instance will stop accepting new entity mappings. In addition, in some situations, workload balance module 510 implements an anchor entity mapping in which module 510 maps an anchor entity to a given target database instance. In this example, the anchor entity has a significant capacity footprint on the target instance and a single anchor entity is allowed to be mapped to a given target database instance.

In some situations, a migration planning module 140 assigns an anchor identifier to one or more large entities such that workload balance module 510 performs an anchor entity mapping based on these identifiers. In addition to satisfying database instance capacity threshold constraints, workload balance module 510 meets additional metadata constraints such as release cycle constraints of different entities and database instances. For example, the release cycle of a given entity must match that of a database instance it is mapped to so that the release cycles are consistent after the data is migrated. As one specific example, if the downtime (e.g., the unavailability or read-only state) of data for an entity is specified to be five minutes every two weeks while the downtime of a database instance to which this entity is mapped is ten minutes every three weeks, then the release cycles of the entity and the database instance do not match (and thus module 510 will not map this entity to this database instance).

The following pseudocode provides an example execution of various planning procedures performed by migration planning module 140. For example, the following elements correspond to the execution of workload balance module 510 and migration event planning module 540:

```
class organization ( )
   def_init_(orgid, source_node, metric_value):
      self.orgid=orgid
      self.source_node=source_pod
      self.metric_value=metric_value
      self.target_node=None
class node( )
   def_init_(node_name, metric_value):
      self.node_name=node_name
      self.metric value=metric value
      self.org._list=[ ]
def base_map (org_list, node_list):
   sort_dec (org_list);
   for org in org_list:
      node=find_min (node_list)
      node.add(org)
      org.target_node=node
def optimize (node_list):
   for i in range(N):
      pre std=std (node_list)
      max_node=find_max (node_list)
      min_node=find_min (node_list)
      min_org=find_min (max_node.org_list)
      move(min_org, max_node, min_node)
      post_std=std(node_list)
      if post_std<pre_std:
         commit_move( )
```

Once swapping module 530 is satisfied with the mappings, module 530 transmits the entity to database instance mappings 512 to migration event planning module 540. Migration event planning module 540, in the illustrated embodiment, obtains a list 542 of entities and corresponding data to be migrated for these entities in addition to the entity to database instance mappings 512 from workload balance module 510. For example, the list 542 of entities may include three different entities and module 540 determines how many entities and how much of each of their data to migrate within a given migration event. Migration event planning module 540 minimizes the number of migration events required to migrate data for eligible entities mapped to target instances. For example, migration event planning module 540 determines how many gigabytes (GB) of data for how many entities can be included in a least number of migration event. In the illustrated embodiment, migration event planning module 540 assigns 100 GB of data from a first entity, 50 GB of data from a second entity, and 50 GB of data from a third entity to be migrated during event 544A (this assignment results in 200 GB of an 225 GB event capacity being utilized). Similarly, in the illustrated embodiment, migration event planning module 540 assigns 100 GB of data from the first entity and 50 GB from the second entity to be migrated during migration event 544B (resulting in 150 GB of an event capacity being utilized). After assigning data for a plurality of entities to different migration events, migration event planning module 540 transmits this number of migration events 522 and the respective data assignments for each event to migration impact simulation module 550.

In some embodiments, the event assignment performed by module 540 is performed based on computational constraints. For example, if the computational costs for a given migration event is too high, module 540 may determine to migrate data for only two entities within a single migration event even if the available computational resources would allow for migration of data for five different entities within a single migration event. For example, if data is being migrated to a cloud database, migration event planning module 540 may limit the number of entities assigned to each migration event (e.g., to reduce the cost of the migration). In some embodiments, module 540 assigns data to different migration events based on the geographic location of the data as well as the relief cycles of the data according to the constraints of the entity corresponding to this data. For example, module 540 may group together data from two different entities into a migration event based on these entities having similar (or the same) geographic locations and relief cycles.

In some embodiments, migration event planning module 540 uses a multi-dimensional knapsack algorithm to determine when to execute migration events, how many migration events to execute, and how much data to include in each migration event. For example, based on entity to instance mappings 512 provided by workload balance module 510, migration event planning module 540 determines the number of events required to execute each mapping. As one specific example, if data for a first entity and a third entity is mapped to instance 522A, then module 540 may assign data from the first entity and the third entity to a first migration event in order to migrate data for these two entities at the same time to the same database instance 522A. As another example, migration event planning module 540 accounts for constraints on the time of day or the day of the week that data for a given entity may be migrated when assigning data for this entity to one or more events. When executing a multi-dimensional knapsack algorithm, migration event planning module 540 minimizes the number of required migration events (e.g., more events results in greater overhead and costs) to migrate data for multiple entities while satisfying constraints on two or more dimensions (i.e., maximum database size and maximum entity count). The multi-dimensional knapsack algorithm executes various strategies (e.g., a database size first strategy, an entity count strategy, etc.) to simulate the event planning and guarantee that e.g., the event size is within a specified size constraint during the simulation. The algorithm outputs a minimum number of migration events that satisfy the multiple dimensions and this number of events is included in a final migration plan. In some situations, a system administrator may choose a number of dimensions (constraints) to feed into the multi-dimensional knapsack algorithm.

Migration impact simulation module 550, in the illustrated embodiment, simulates the impact of planned migrations on the destination database. For example, because the disclosed system plans migrations ahead of actual execution of the migration plans (e.g., 30, 60, 90, etc. days ahead of execution), the migration system 120 is able to estimate the target instance utilizations (e.g., how much CPU and storage will be used when the migration plans are executed) ahead of actually executing the generated migration plans. For example, it may be advantageous to predict target instance utilizations for various migration plans before generating migration plans that will add additional entity mappings to these target instances. While the eligibility module 122 discussed above with reference to FIGS. 1 and 2 provides a method for forecasting the utilization footprint of a given entity, the migration impact simulation module 550 provides additional visibility of the overall impact of planned migrations (that often involve multiple different entities).

In the illustrated embodiment, the migration impact simulation module 550 predicts the expected target instance metrics based on planned migrations by simulating the movement of entity data between source and target instances. Module 550 predicts, prior to actual execution of the migration events generated by workload balance module 510 and migration event planning module 540 involving multiple entities, how much of each target database instance (e.g., each cloud instance) will be utilized during execution of events 522 by simulating movement of entity data between source and target database instances.

Migration impact simulation module 550, in the illustrated embodiment, includes instances 522A, 522B, and 522C and entities A, B, and C. Module 550, in the illustrated embodiment, calculates an overall utilization of a given instance based on the movement of data to and/or from the given instance. For example, module 550 calculates an overall instance utilization (M1$t$) for instance 522A by subtracting the capacity utilization to move data for entity A (MA) and the capacity utilization to move data for entity C (MC) from a given metric (M1) of instance 522A. Note that the given metric M1 may be a CPU metric, an I/O metric, a storage metric, etc. Similarly, for instance 522B, module 550 calculates an overall instance utilization (M2$t$) by adding the capacity utilization to move of data for entity A (MA') and the capacity utilization to move data for entity B (MB') to instance 522B to the overall capacity (M2) of instance 522B. Further, for instance 522C, module 550 calculates an overall instance utilization (M3$t$) by subtracting the capacity utilization to move data for entity B (MB) from instance 522C and adding the capacity utilization to move data for entity C (MC') to the instance 522C to the overall capacity (M3) of instance 522C. Based on these calculations, migration impact simulation module 550 transmits database instance utilizations 552 (for the different instances 522A-522C) to workload balance module 510. For example, these simulated utilizations may be used by module 510 to adjust entity to database instance mappings 512 prior to executing data migration for these entities.

Example Method

Figure 6:
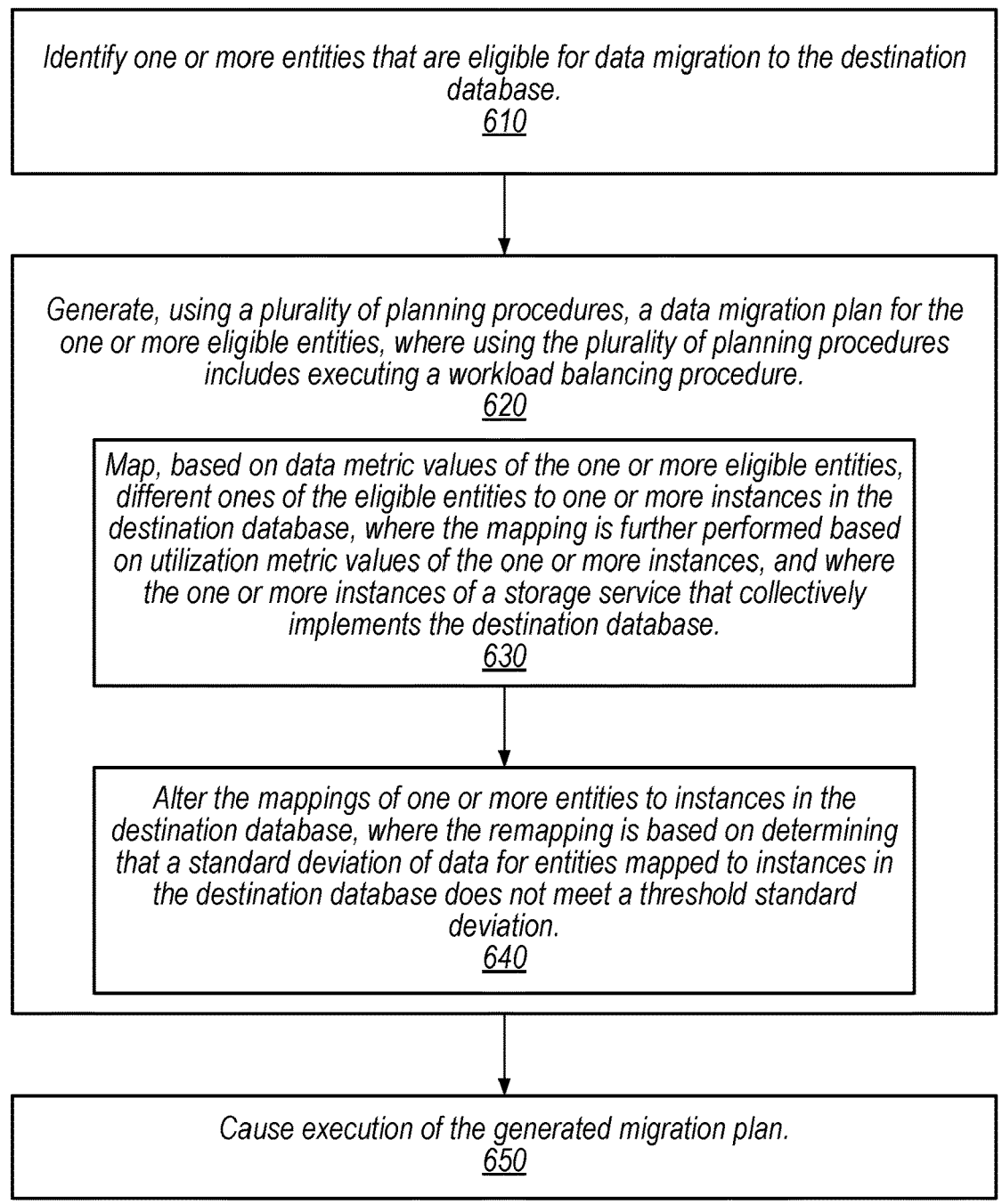
FIG. 6 is a flow diagram illustrating an example method for generating a migration plan for migrating, for one or more entities, data of a source database to a destination database, according to some embodiments.

FIG. 6 is a flow diagram depicting an example method for generating a migration plan for migrating, for one or more entities, data of a source database to a destination database, according to some embodiments. The method 600 shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, method 600 is performed by migration system 120. In some embodiments, system 120 is a server system. In other embodiments, system 120 is executed via a cloud computing platform that includes scalable servers. For example, system 120 may be execute remotely from source database 160 and destination database 150 by a system other than system 100.

At 610, in the illustrated embodiment, the method includes identifying one or more entities that are eligible for data migration to the destination database. In some embodiments, the destination database is a cloud database, where the instances of the destination database are geographically distributed building blocks of the destination database having different processing and storage capacities. In some embodiments, the source database is a first party database, where execution of the migration plan causes migration of first party data for one or more entities from the first party database to the cloud database. In some embodiments, the source database and the destination database are local databases that store data for the one or more entities locally to an enterprise server that gathers data for the one or more entities. For example, the source and destination databases may be internal to a given enterprise platform.

At 620, in the illustrated embodiment, the method includes generating, using a plurality of planning procedures, a data migration plan for the one or more eligible entities, wherein using the plurality of planning procedures includes executing a workload balancing procedure. In some embodiments, executing the method includes determining, for the one or more eligible entities, one or more metrics of the following types of metrics: a balance metric indicating database central processing unit and storage utilization, a constraint metric indicating requirements of an eligible entity on instances of a destination database, a date and region eligibility metric indicating a location and date at which data is migratable for an eligible entity, and a database instance capacity threshold. For example, the metrics may be determined via execution of the data loading and integration module 220.

In some embodiments, executing the method includes determining whether to exclude one or more of the one or more eligible entities from the data migration plan, wherein the determining is based on one or more conditions of the following types of conditions: whether the eligible entities are already included in a previously generated migration plan and whether the one or more eligible entities are missing metrics required for generating the migration plan. In some embodiments, executing the method includes converting, using a gear ratio, one or more metrics of the one or more eligible entities on the source database to expected metric values on the destination database, where the one or more metrics include database central processing unit time and utilization.

At 630, in the illustrated embodiment, generating the data migration plan includes at least mapping, based on data metric values of the one or more eligible entities, different ones of the eligible entities to one or more instances in the destination database, where the mapping is further performed based on utilization metric values of the one or more instances, and where the one or more instances are instances of a storage service that collectively implements the destination database. In some embodiments, the mapping includes iteratively performing until a queue including the one or more eligible entities is empty: determining an entity that has a largest data metric value relative to other eligible entities, and mapping the determined entity to an instance in the destination database that corresponds to a minimum utilization metric value relative to one or more other instances in the destination database. For example, the migration system might sort eligible entities into a queue from smallest to largest (in terms of the amount of data to be migrated for each entity) and then map the largest entities to cloud database instances that are currently being utilized the least (which may be instances having an overall largest capacity). In some embodiments, the mapping is further performed based on one or more limitations of the following types of limitations: capacity thresholds of the one or more instances of the destination database, an anchor identifier assigned to one or more eligible entities, release cycles of the one or more eligible entities, and release cycles of the one or more instances.

At 640, in the illustrated embodiment, generating the data migration plan further includes at least altering the mappings of one or more entities to instances in the destination database, wherein altering the mappings is based on determining that a standard deviation of data for entities mapped to instances in the destination database does not meet a threshold standard deviation. In some embodiments, executing the method includes determining, using a multi-dimensional knapsack procedure based on the mapping, a number of migration events for migrating data for the one or more eligible entities from the source database to the destination database, where the multi-dimensional knapsack procedure operates based on multiple constraints, including at least a number of entities allowed to be included within a given migration event, relief cycles of the one or more eligible entities, and locations of the one or more eligible entities. For example, the number of entities allowed to be included within a given migration event may be based on operational costs (including available computational resources to be used to migrate data for a given number of entities). In some embodiments, executing the method includes assigning respective ones of the one or more eligible entities to different ones of the migration events. In some embodiments, the standard deviation that does not meet the threshold standard deviation is greater than the threshold standard deviation.

In some embodiments, the generated migration plans are generated for execution over a given window of time. In some embodiments, executing the method includes altering, in response to a performance report generated during execution of the generated migration plans within the given window of time, one or more of the generated migration plans using one or more of the plurality of planning models. For example, an administrator corresponding to a given entity may provide feedback for a generated migration plan indicating one or more aspects to alter during execution of that migration plan going forward.

At 650, in the illustrated embodiment, the method includes causing execute of the generated data migration plan. In some embodiments, prior to causing execution of the generated data migration plan, executing the method further includes simulating migration of data for one or more entities from instances of the source database to instances of the destination database according to the generated data migration plan. In some embodiments, executing the method includes updating the generated data migration plan by executing at least the workload balancing procedure of the plurality of planning procedures a second time based on results of simulating the migration of data according to the generated data migration plan.

In some embodiments, the generated data migration plan is an overall migration plan that includes individual migration plans generated for respective ones of the one or more entities that are eligible for data migration to the destination database, where during the generating the individual migration plans impact one another and are executed independently of one another. In some embodiments, in response to receiving a request from a client device to access data of a given eligible entity, the method is executable to determine, based on execution of the generated data migration plan, whether data specified in the request is currently stored at the source database or the destination database. In some embodiments, executing the method further includes accessing, based on the determination, one of the source database and destination database to retrieve the data specified in the request.

Exemplary Multi-Tenant Database System

Figure 7:
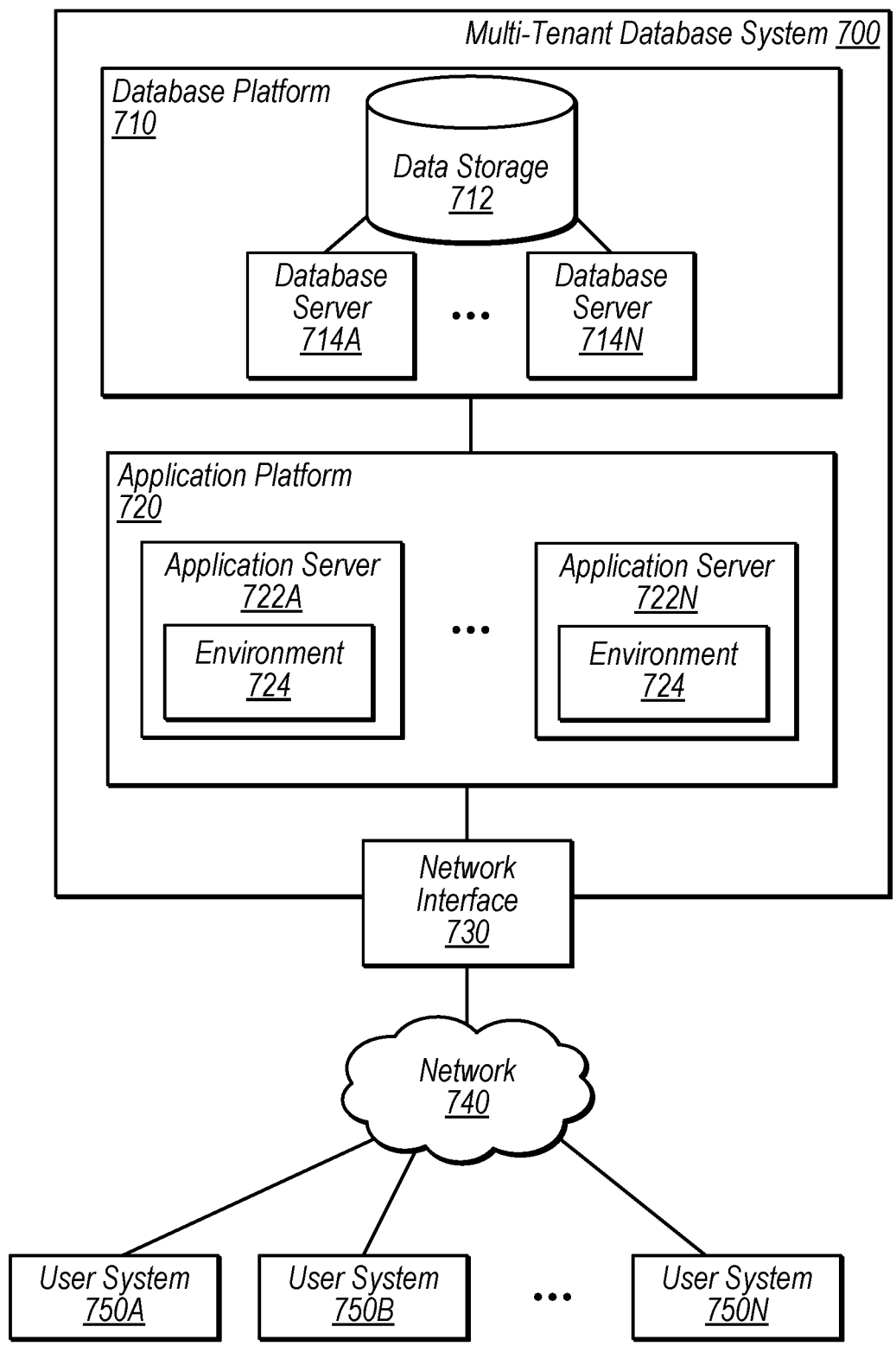
FIG. 7 is a block diagram illustrating elements of a multi-tenant system, according to some embodiments.

Turning now to FIG. 7, an exemplary multi-tenant database system (MTS) 700 in which various techniques of the present disclosure can be implemented is shown—e.g., system 100 may be MTS 700. In FIG. 7, MTS 700 includes a database platform 710, an application platform 720, and a network interface 730 connected to a network 740. Also as shown, database platform 710 includes a data storage 712 and a set of database servers 714A-N that interact with data storage 712, and application platform 720 includes a set of application servers 722A-N having respective environments 724. In the illustrated embodiment, MTS 700 is connected to various user systems 750A-N through network 740. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 700, in various embodiments, is a set of computer systems that together provide various services to users (alternatively referred to as "tenants") that interact with MTS 700. In some embodiments, MTS 700 implements a customer relationship management (CRM) system that provides mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify opportunities, record service issues, and manage marketing campaigns. MTS 700 may also enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 712 is used to implement a database (e.g., database 150 or 160) comprising a collection of information that is organized in a way that allows for access, storage, and manipulation of the information. Data storage 712 may implement a single database, a distributed database, a collection of distributed databases, a database with redundant online or offline backups or other redundancies, etc. As part of implementing the database, data storage 712 may store files (e.g., files including database access requests 114) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 712 is organized as part of a log-structured merge-tree (e.g., an LSM tree executed by database management system 110). An LSM tree normally includes two high-level components: an in-memory buffer and a persistent storage. In operation, a database server 714 may initially write database records into a local in-memory buffer before later flushing those records to the persistent storage (e.g., data storage 712). As part of flushing database records, the database server 714 may write the database records into new files that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 712.

When a database server 714 wishes to access a database record for a particular key, the database server 714 may traverse the different levels of the LSM tree for files that potentially include a database record for that particular key. If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 714, in various embodiments, are hardware elements, software routines, or a combination thereof capable of providing database services, such as data storage, data retrieval, and/or data manipulation. One or more of database servers 714A-N may correspond to database 150 or database 160. Such database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree-database servers 714 maintain the LSM tree implemented on database platform 710. In some embodiments, database servers 714 implement a relational database management system (RDMS) or object oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory buffer for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 720 and database platform 710, however, it will be apparent to those skilled in the art that other transport protocols may be used depending on the network interconnect used.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications (e.g., business logic). Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F5 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as are round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined one or more permission levels associated with the current user. For example, when a user is using a particular user system 750 to interact with MTS 700, that user system 750 may have capacities (e.g., user privileges) allotted to that user. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

Exemplary Computer System

Figure 8:
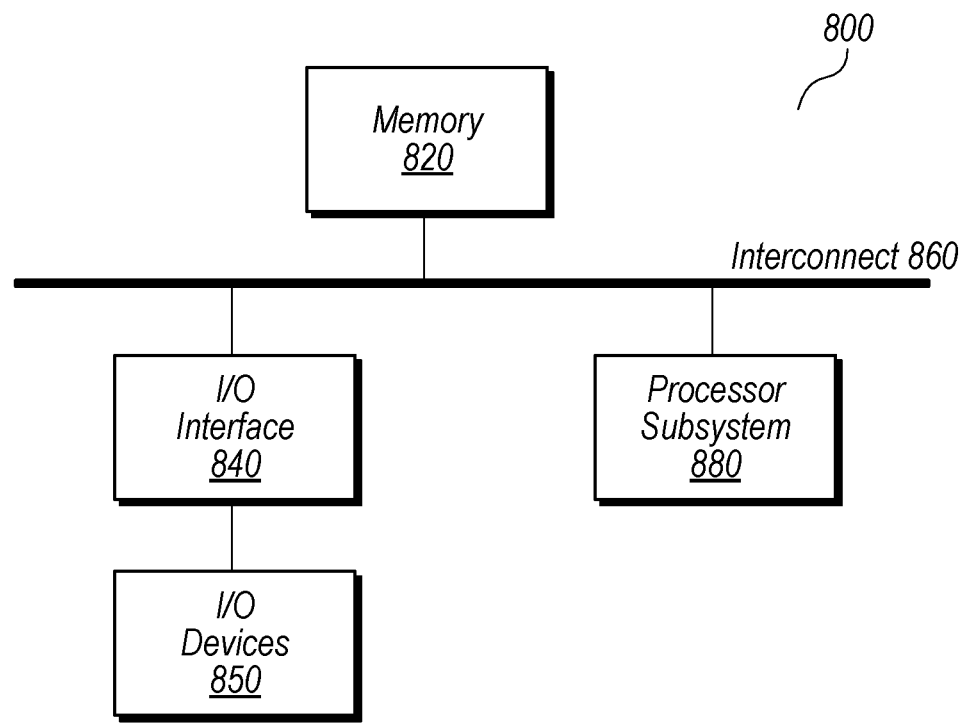
FIG. 8 is a block diagram illustrating elements of a computer system configured to implement various systems described in the present disclosure, according to some embodiments.

Turning now to FIG. 8, a block diagram of an exemplary computer system 800, which may implement system 100, database 150, database 160, MTS 700, and/or user system 750, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement migration system 120 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over Wi-Fi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . W, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for generating a migration plan for migrating, for one or more entities, data of a source database to a destination database, comprising:
   identifying one or more entities that are eligible for data migration to the destination database;
   generating, using a plurality of planning procedures, a data migration plan for the one or more eligible entities, wherein using the plurality of planning procedures includes executing a workload balancing procedure, including at least:
      mapping, based on data metric values of the one or more eligible entities, different ones of the eligible entities to one or more instances in the destination database, wherein the mapping is further performed based on utilization metric values of the one or more instances, and wherein the one or more instances are instances of a storage service that collectively implements the destination database; and
      altering the mappings of one or more entities to instances in the destination database, wherein altering the mappings is based on determining that a standard deviation of data for entities mapped to instances in the destination database does not meet a threshold standard deviation;
   simulating migration of data for one or more entities from instances of the source database to instances of the destination database according to the generated data migration plan;
   updating the generated data migration plan based on results of the simulating; and
   causing execution of the generated data migration plan.

2. The method of claim 1, wherein the destination database is a cloud database, wherein the instances of the destination database are geographically distributed building blocks of the destination database having different processing and storage capacities, wherein the source database is a first party database, and wherein execution of the migration plan causes migration of first party data for one or more entities from the first party database to the cloud database.

3. The method of claim 1, wherein the mapping further includes iteratively performing until a queue including the one or more eligible entities is empty:
   determining an entity that has a largest data metric value relative to other eligible entities; and
   mapping the determined entity to an instance in the destination database that corresponds to a minimum utilization metric value relative to one or more other instances in the destination database.

4. The method of claim 1, wherein the mapping is further performed based on one or more limitations of the following types of limitations: capacity thresholds of the one or more instances of the destination database, an anchor identifier assigned to one or more eligible entities, release cycles of the one or more eligible entities, and release cycles of the one or more instances.

5. The method of claim 1, further comprising:
   determining, using a multi-dimensional knapsack procedure based on the mapping, a number of migration events for migrating data for the one or more eligible entities from the source database to the destination database, wherein the multi-dimensional knapsack procedure operates based on multiple constraints; and
   assigning respective ones of the one or more eligible entities to different ones of the migration events.

6. The method of claim 1, wherein updating the generated data migration plan includes executing at least the workload balancing procedure of the plurality of planning procedures a second time based on results of simulating the migration of data according to the generated data migration plan.

7. The method of claim 1, further comprising:
   determining, for the one or more eligible entities, one or more metrics of the following types of metrics: a balance metric indicating database central processing unit and storage utilization, a constraint metric indicating requirements of an eligible entity on instances of the destination database, a date and region eligibility metric indicating a location and a date at which data is migratable for an eligible entity, and a database instance capacity threshold.

8. The method of claim 1, further comprising:
   determining whether to exclude one or more of the one or more eligible entities from the data migration plan, wherein the determining is based on one or more conditions of the following types of conditions: whether the eligible entities are already included in a previously generated migration plan and whether the one or more eligible entities are missing metrics required for generating the migration plan.

9. The method of claim 1, further comprising:
converting, using a gear ratio, one or more metrics of the one or more eligible entities on the source database to expected metric values on the destination database, wherein the one or more metrics of the eligible entities include database central processing unit time and utilization.

10. A non-transitory, computer-readable medium having instructions stored thereon that are capable of causing a migration system to implement operations comprising:
identifying one or more entities that are eligible for data migration;
generating, using a plurality of planning models, migration plans for migrating first party data of the identified entities to a cloud database, wherein using the plurality of planning procedures include executing a workload balancing procedure, including at least:
mapping, based on data metric values of the one or more eligible entities, different ones of the eligible entities to one or more instances in the cloud database, wherein the mapping is further performed based on utilization metric values of the one or more instances, and wherein the one or more instances are instances of a storage service that collectively implements the cloud database; and
altering the mappings of one or more entities to instances in the cloud database, wherein altering the mappings is based on determining that a standard deviation of data for entities mapped to instances in the cloud database does not meet a threshold standard deviation;
simulating migration of data for the one or more eligible entities according to the generated data migration plan;
updating the generated data migration plan based on results of the simulating; and
causing execution of one or more of the generated migration plans.

11. The non-transitory computer-readable medium of claim 10, wherein the standard deviation that does not meet the threshold standard deviation is greater than the threshold standard deviation.

12. The non-transitory computer-readable medium of claim 10, wherein the mapping includes mapping an entity that has a largest data metric value relative to other eligible entities to an instance in the cloud database that corresponds to a minimum utilization metric value relative to other instances in the cloud database.

13. The non-transitory computer-readable medium of claim 10, wherein the operations further comprise:
determining, using a multi-dimensional knapsack procedure based on the mapping, a number of migration events for migrating data for the one or more eligible entities from a source database to the cloud database, wherein the multi-dimensional knapsack procedure operates based on multiple constraints, including at least a number of entities allowed to be included within a given migration event, relief cycles of the one or more eligible entities, and locations of the one or more eligible entities; and
assigning respective ones of the one or more eligible entities to different ones of the migration events.

14. The non-transitory computer-readable medium of claim 10, wherein
updating the generated data migration plan includes executing at least the workload balancing procedure of the plurality of planning models a second time based on results of simulating the migration of data according to the generated data migration plan.

15. The non-transitory computer-readable medium of claim 10, wherein the generated migration plans are generated for execution over a given window of time, and wherein the operations further comprise:
in response to a performance report generated during execution of the generated migration plans within the given window of time, altering one or more of the generated migration plans using one or more of the plurality of planning models.

16. A system, comprising:
at least one processor; and
a memory having instructions stored thereon that are executable by the at least one processor to cause the system to generate a data migration plan for migrating, for one or more entities, data of a source database to a destination database, including:
identifying one or more entities that are eligible for data migration to the destination database;
generating, using a plurality of planning procedures, a data migration plan for the one or more eligible entities, wherein using the plurality of planning procedures includes executing a workload balancing procedure, including at least:
mapping, based on data metric values of the one or more eligible entities, different ones of the eligible entities to one or more instances in the destination database, wherein the mapping is further performed based on utilization metric values of the one or more instances, and wherein the one or more instances are instances of a storage service that collectively implements the destination database; and
altering the mappings of one or more entities to instances in the destination database, wherein altering the mappings is based on determining that a standard deviation of data for entities mapped to instances in the destination database does not meet a threshold standard deviation;
simulating migration of data for one or more entities from instances of the source database to instances of the destination database according to the generated data migration plan;
updating the generated data migration plan based on results of the simulating; and
causing execution of the generated data migration plan.

17. The system of claim 16, wherein the source database and the destination database are local databases that store data for the one or more entities locally to an enterprise server that gathers data for the one or more entities.

18. The system of claim 16, wherein the instructions are further executable by the at least one processor to cause the system to:
determine an entity that has a largest data metric value relative to other eligible entities; and
map the determined entity to an instance in the destination database that corresponds to a minimum utilization metric value relative to one or more other instances in the destination database.

19. The system of claim 16, wherein the generated data migration plan is an overall migration plan that includes individual migration plans generated for respective ones of the one or more entities that are eligible for data migration to the destination database, wherein during the generating the individual migration plans impact one another and are executed independently of one another.

20. The system of claim 16, wherein the instructions are further executable by the at least one processor to cause the system to:
- in response to receiving a request from a client device to access data of a given eligible entity, determine, based on execution of the generated data migration plan, whether data specified in the request is currently stored at the source database or the destination database; and
- accessing, based on the determination, one of the source database and the destination database to retrieve the data specified in the request.

\* \* \* \* \*